US012456819B2

(12) United States Patent
Huang et al.

(10) Patent No.: US 12,456,819 B2
(45) Date of Patent: Oct. 28, 2025

(54) TRANSPARENT ANTENNA ON LENS WITH METALIZED EDGE

(71) Applicant: Meta Platforms Technologies, LLC, Menlo Park, CA (US)

(72) Inventors: Wei Huang, San Diego, CA (US); Yasuo Morimoto, Cupertino, CA (US); Boon Shiu, Palo Alto, CA (US); Geng Ye, Union City, CA (US); Umar Azad, San Jose, CA (US); Eswarappa Channabasappa, Milpitas, CA (US); Tao Zhou, San Jose, CA (US); Peter Eli Renner, San Jose, CA (US); Jiang Zhu, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 229 days.

(21) Appl. No.: 18/475,496

(22) Filed: Sep. 27, 2023

(65) Prior Publication Data

US 2024/0162623 A1 May 16, 2024

Related U.S. Application Data

(60) Provisional application No. 63/383,205, filed on Nov. 10, 2022.

(51) Int. Cl.
*H01Q 15/16* (2006.01)
*H01Q 1/27* (2006.01)
*H01Q 3/46* (2006.01)

(52) U.S. Cl.
CPC ............ *H01Q 15/168* (2013.01); *H01Q 3/46* (2013.01); *H01Q 1/273* (2013.01)

(58) Field of Classification Search
CPC ...... H01Q 1/1271; H01Q 1/273; H01Q 1/364; H01Q 3/46; H01Q 15/168
See application file for complete search history.

(56) References Cited

U.S. PATENT DOCUMENTS 9,547,335 B1 * 1/2017 Bevelacqua .......... H01Q 1/273

FOREIGN PATENT DOCUMENTS

CN 114879369 A * 8/2022 ............. H04W 4/80

* cited by examiner

*Primary Examiner* — Hoang V Nguyen
(74) *Attorney, Agent, or Firm* — Foley & Lardner LLP

(57) ABSTRACT

The disclosed apparatus may include an antenna radiating structure that includes an active transparent mesh portion as well as a non-transparent antenna radiator portion. By combining transparent metal mesh and non-transparent metallic film into the antenna radiating structure, the disclosed apparatus results in improved radiation efficiency. Moreover, when overlaid on a transparent lens (such as with a pair of augmented reality glasses), the antenna radiating structure leaves the optical transparency of the lens largely unaffected due to the placement of the non-transparent metallic film. Various other implementations are also disclosed.

20 Claims, 8 Drawing Sheets

(Without Metalized Edge)

(With Metalized Edge)

TRANSPARENT ANTENNA ON LENS WITH METALIZED EDGE

CROSS REFERENCE TO RELATED APPLICATION

This application claims the benefit of U.S. Provisional Application No. 63/383,205, filed Nov. 10, 2022, the disclosure of which is incorporated, in its entirety, by this reference.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1B:
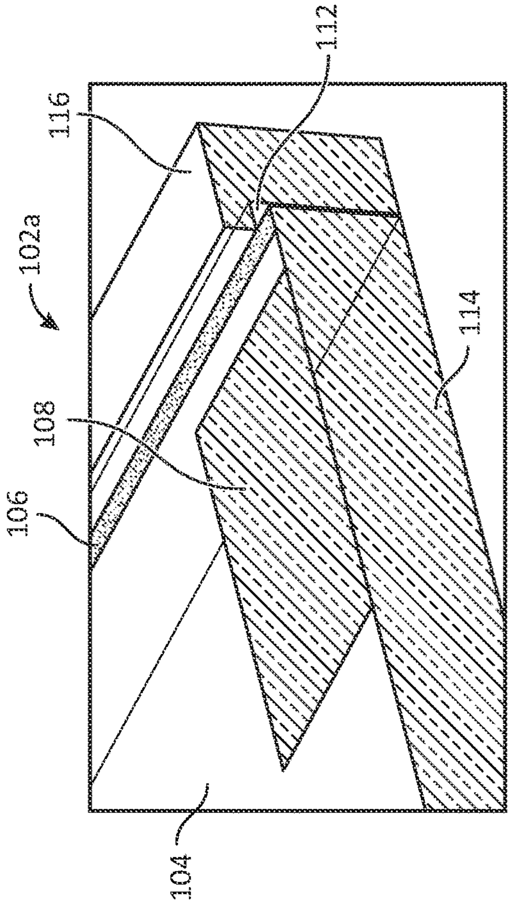
FIG. 1B illustrates a close-up perspective view of the example antenna radiating structure of FIG. 1A in accordance with one or more implementations.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION OF EXEMPLARY IMPLEMENTATIONS

Data dependent applications are increasingly prevalent across a wide range of fields. For example, as virtual reality (VR) and augmented reality (AR) devices become more commonplace, so too does the need for wireless Internet bandwidth. Similarly, additional applications like big data analytics and artificial intelligence (AI) rely heavily on vast amounts of data—often wirelessly transmitted—to perform tasks. As such, wireless networks have experienced significant growth in necessary data volume.

It follows that the various devices that run these applications have an increasing need for a range of wireless features. For example, a VR device may include wireless features such as cellular features, global positioning system (GPS) features, Wi-Fi features, Bluetooth features, and other connectivity antennas. Packing all of these features into various consumer devices, however, is problematic. For example, most consumer devices need to maintain smaller form factors to remain usable. As such, fitting a wide range of wireless features into such constrained form factors is an on-going challenge.

To help overcome this and other challenges, some applications incorporate transparent conducting films into their wireless features. Transparent conducting films such as transparent metal mesh, Indium Tin Oxide (ITO), or a combination of both can offer up to 98% optical transmission with relatively high conductivity. Due to this transparency, transparent conducting films can be used as antennas positioned on a glass lens area—thereby releasing space typically occupied by conventional antennas within the form factor (e.g., a lens frame) of a wireless device. Even though transparent conductors have relatively high conductivity, they continue to experience less conductivity than conventional metals such as copper, magnesium, etc. As such, an antenna structure made out of a transparent conductor (e.g., such as metal mesh) may suffer greater Ohmic loss and have less radiation efficiency than a conventional metal antenna.

In light of this, the present disclosure describes an antenna radiating structure that incorporates the design freedom provided by transparent conductors while maintaining the antenna radiation efficiency of conventional metal antennas. For example, as will be discussed in greater detail below, implementations of the described antenna radiating structure can include a transparent portion and a non-transparent portion. In at least one implementation, the transparent antenna radiator portion may be made of transparent conducting film, such as, metal mesh, ITO, or other material which provides optical transparency and conductivity at RF frequencies. Additionally, the non-transparent antenna radiator portion, which may be located along the outside or around the perimeter of the transparent portion, may have higher conductivity than the transparent portion.

Figure 1A:
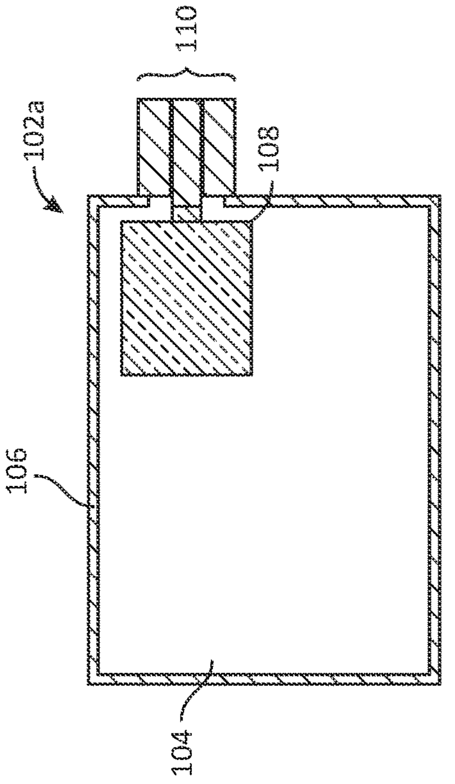
FIG. 1A illustrates an example antenna radiating structure including an active transparent mesh portion and a non-transparent antenna radiator portion in accordance with one or more implementations.
Figure 1D:
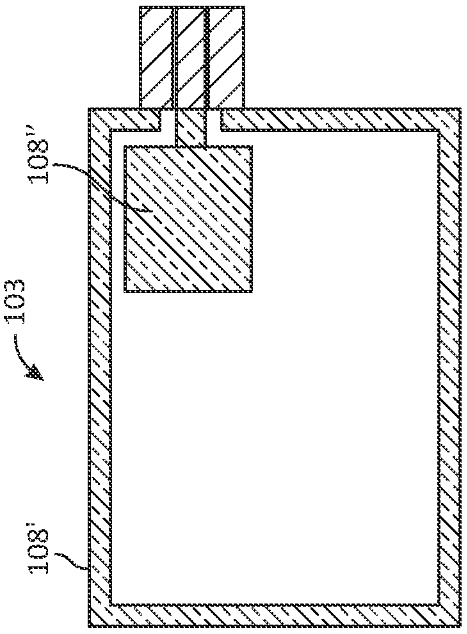
FIGS. 1C-1E illustrate the improved radiation efficiency of the example antenna radiating structure over an antenna radiating structure with only active transparent mesh antennas in accordance with one or more implementations.
Figure 1C:
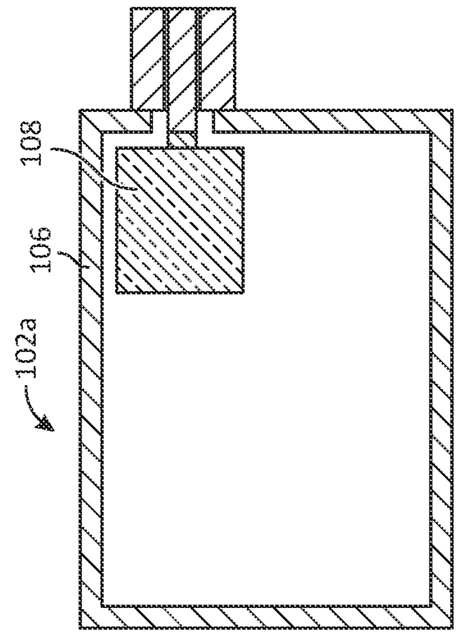
Figure 1E:
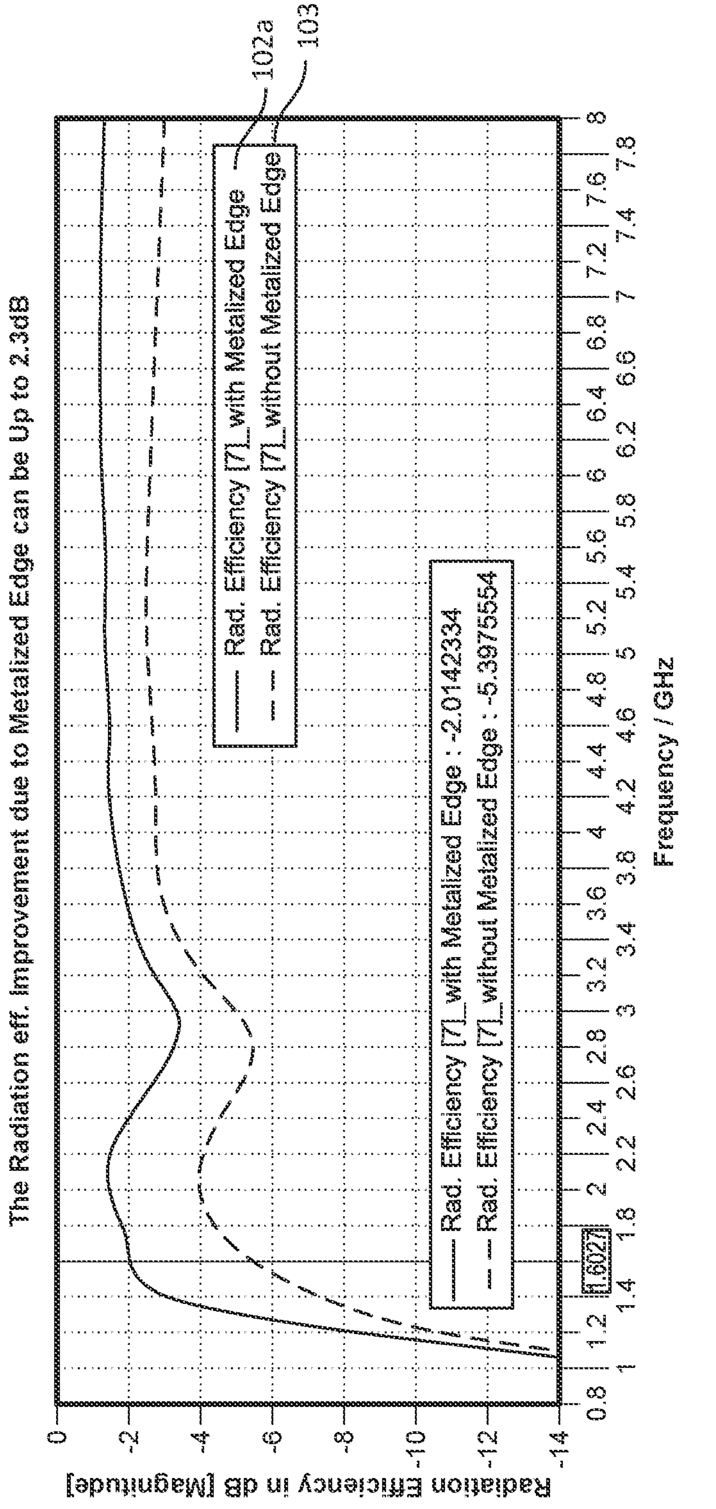
Figure 2:
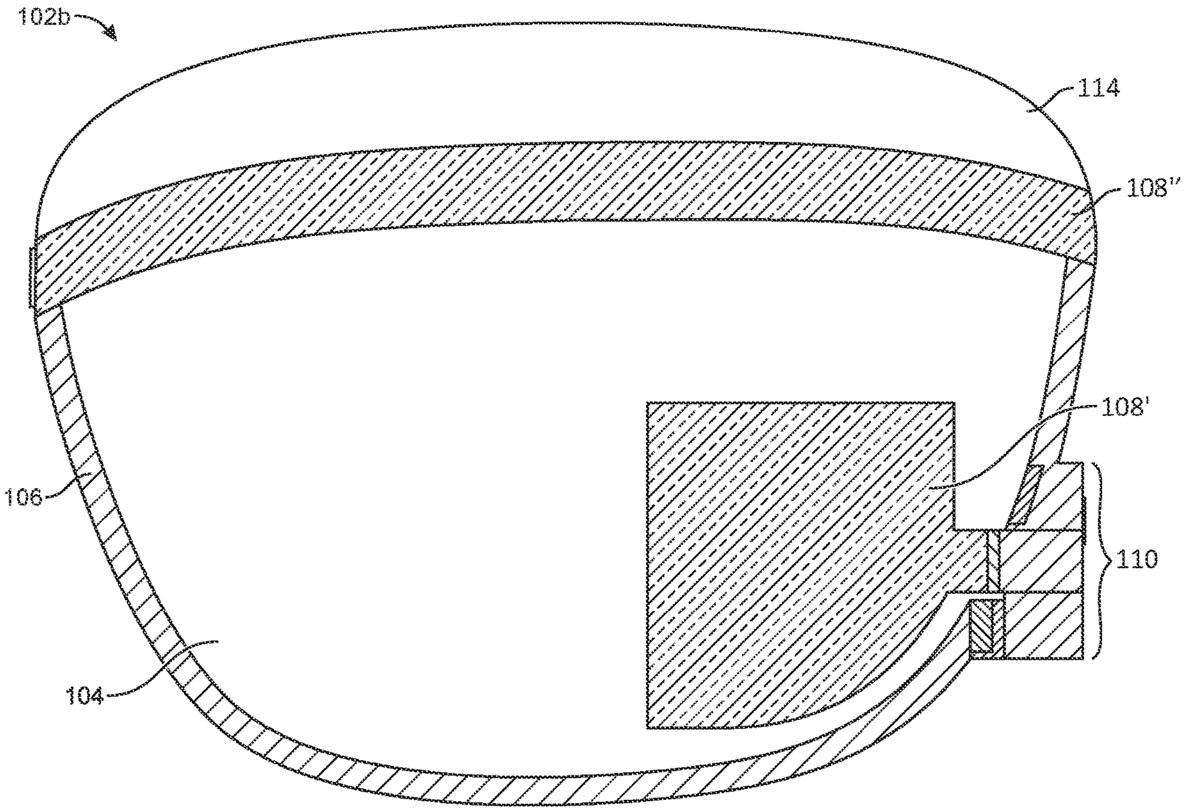
FIG. 2 illustrates another example antenna radiating structure including a non-transparent antenna radiator portion that partially surrounds an active transparent mesh portion in accordance with one or more implementations.
Figure 3A:
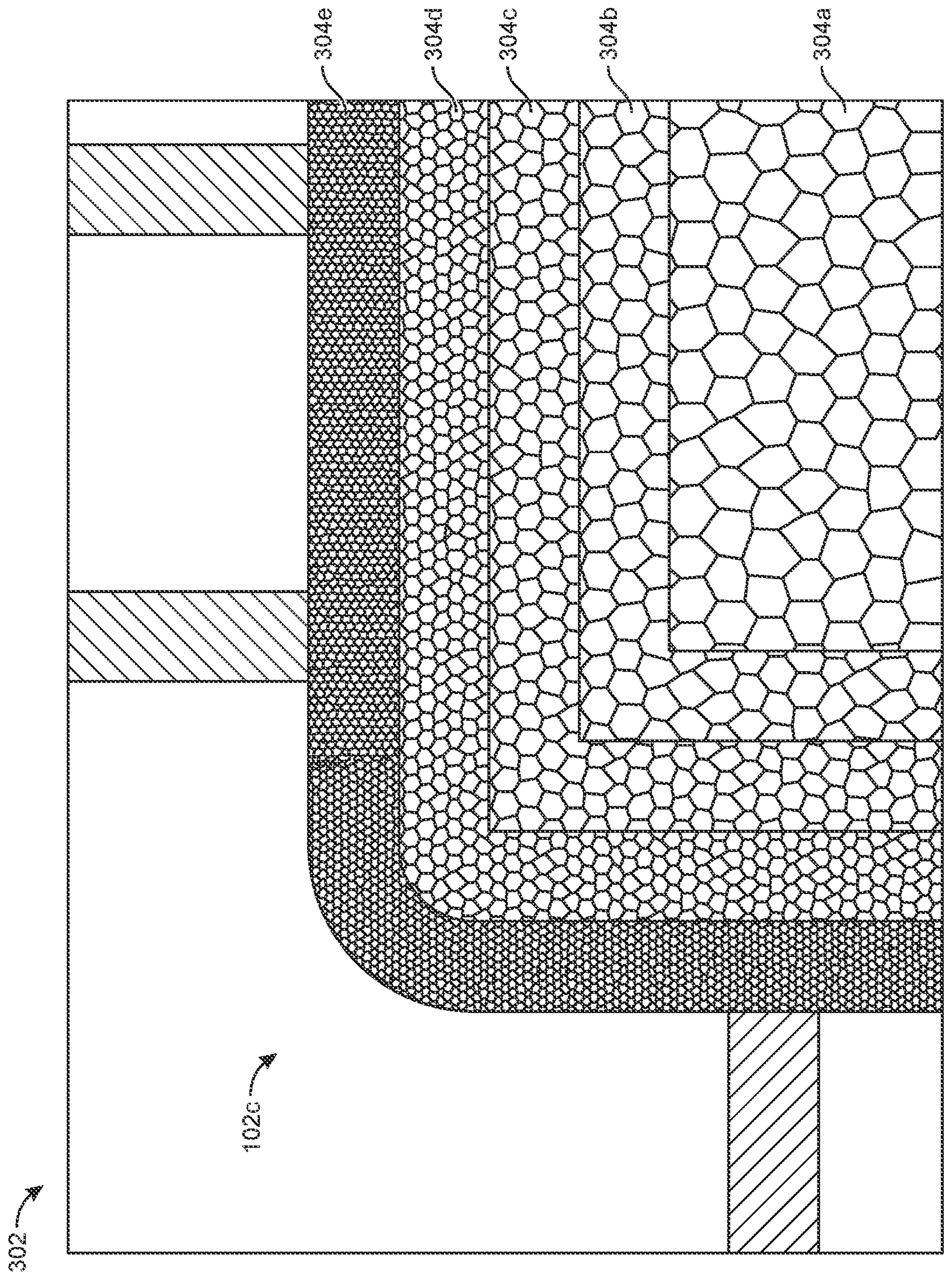
FIGS. 3A and 3B illustrate another example antenna radiating structure including multiple mesh densities of active transparent mesh extending along a perimeter of a lens in accordance with one or more implementations.
Figure 3B:
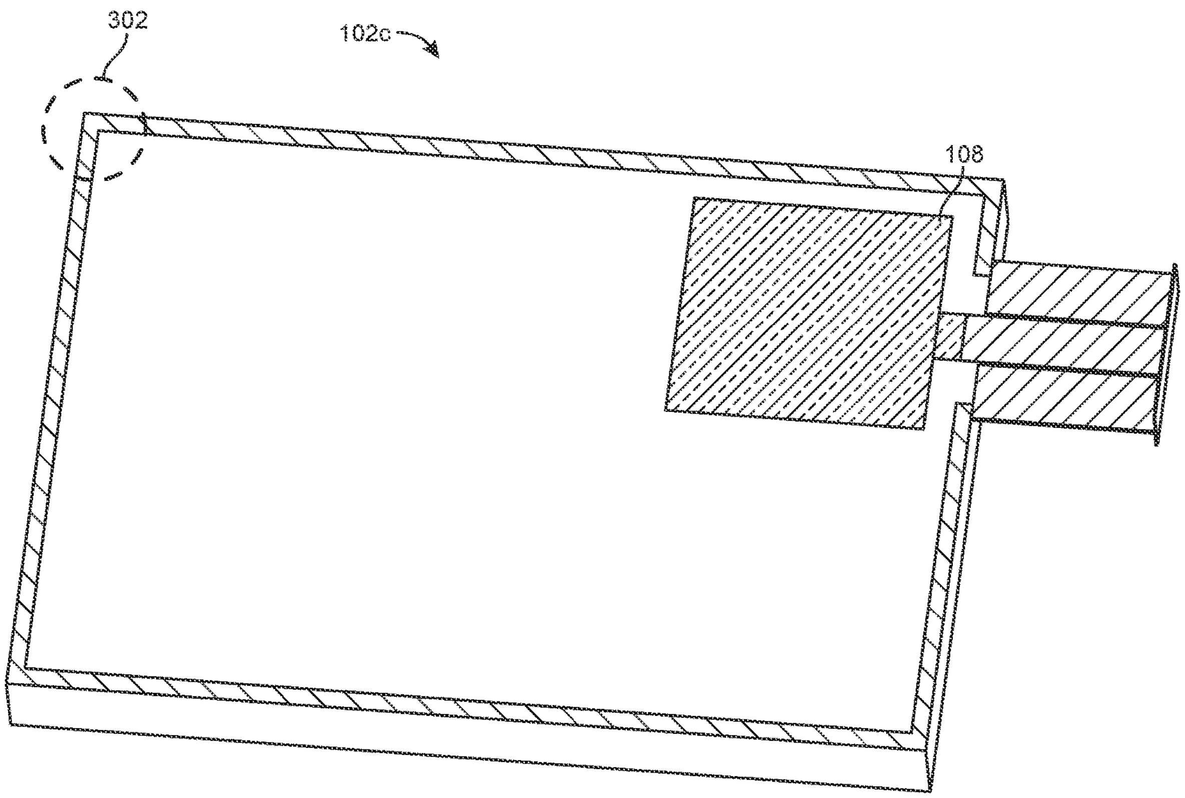
Figure 4:
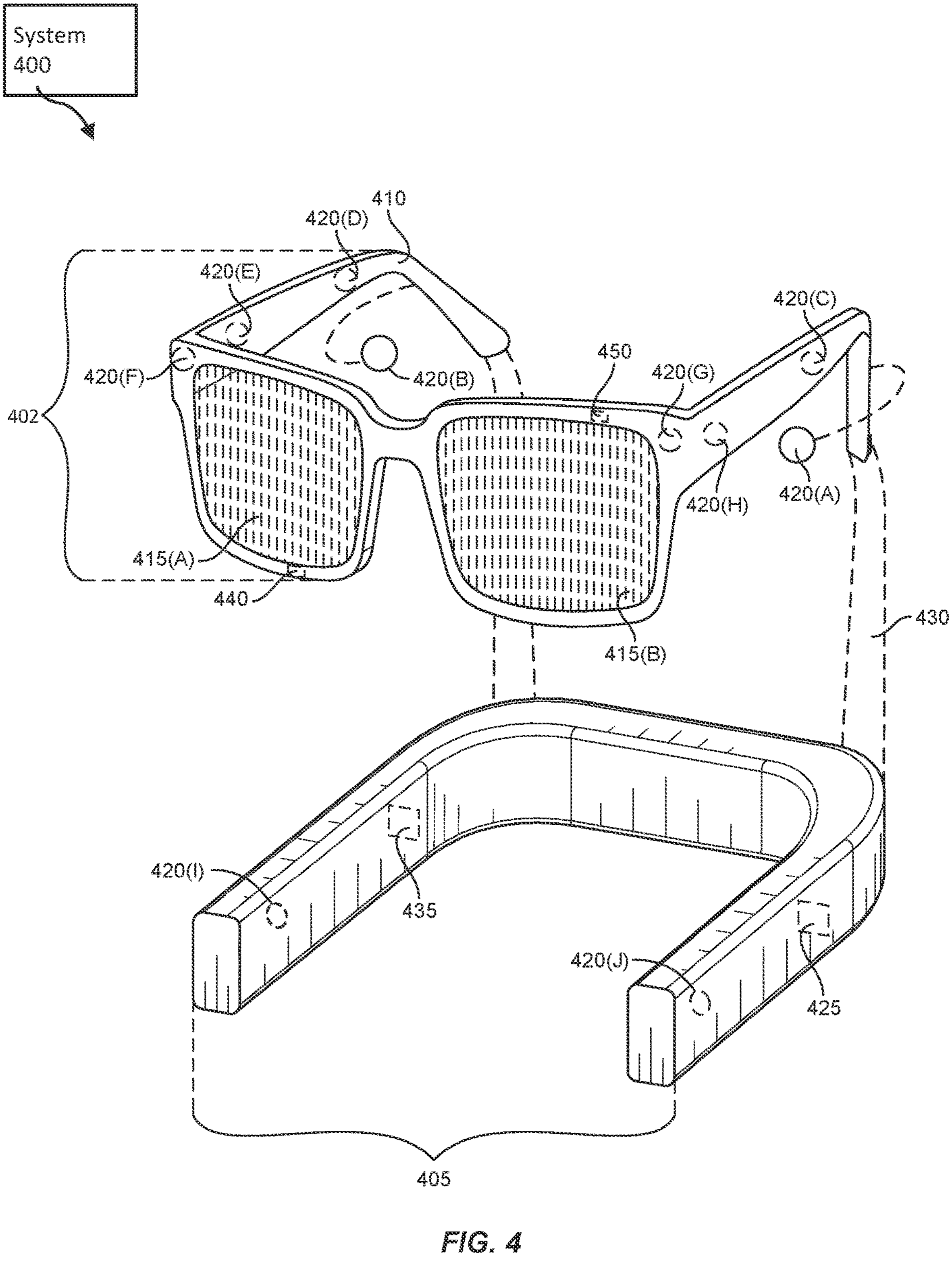
FIG. 4 illustrates perspective views of an augmented-reality system in accordance with one or more implementations.
Figure 5:
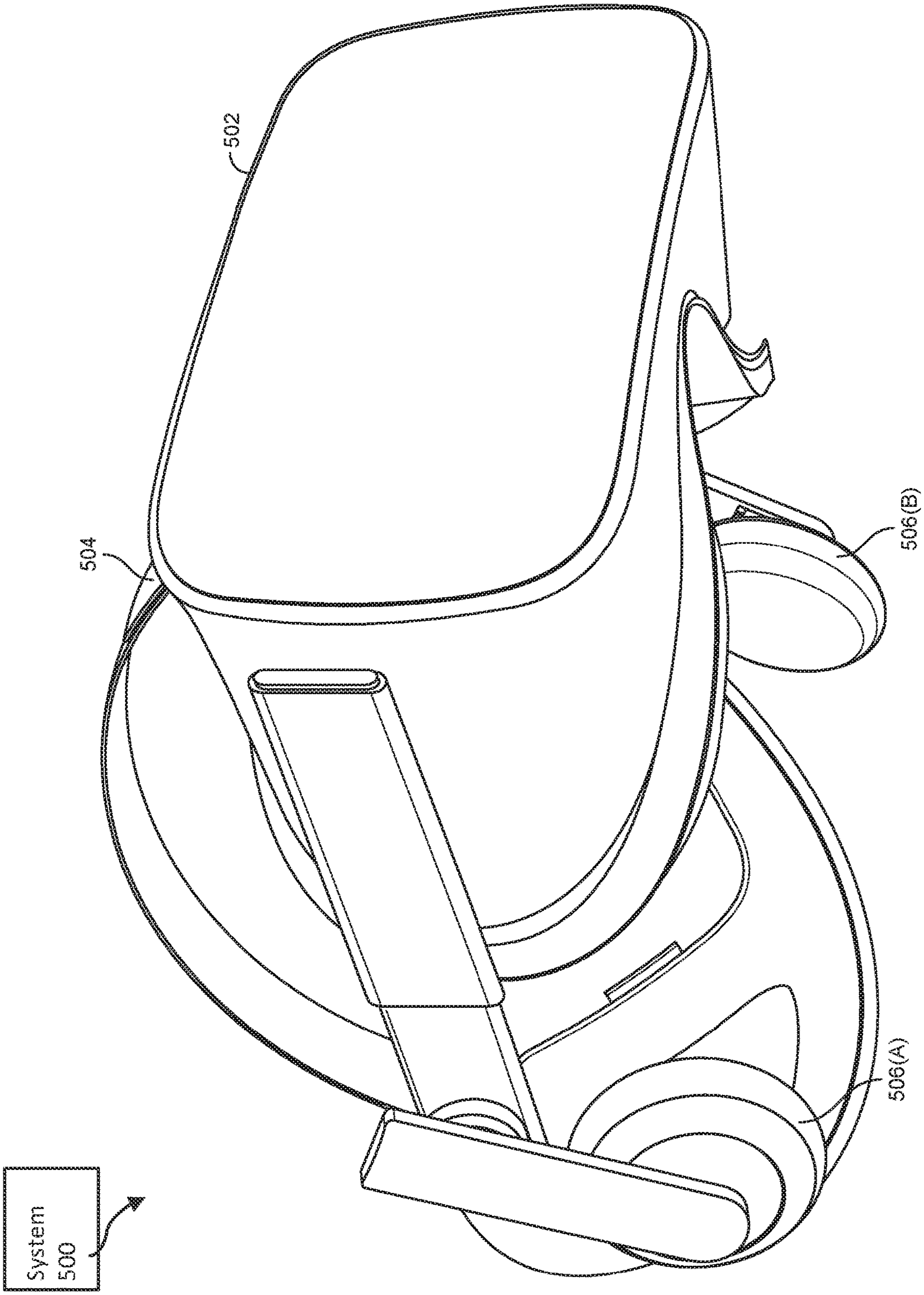
FIG. 5 illustrates a perspective view of a virtual-reality system in accordance with one or more implementations.

The following will provide, with reference to the remaining FIGS. 1A-5, detailed descriptions of eye-tracking systems that incorporate transparent metal mesh. For example, FIG. 1A-1E illustrate an antenna radiating structure incorporating an active transparent mesh portion and a non-transparent antenna radiator portion extending along the perimeter of the structure and the increased efficiency of the structure over other antenna radiating structures including only transparent metal mesh. FIG. 2 illustrates another implementation of the antenna radiating structure including a non-transparent antenna radiator portion extending along a portion of the perimeter of the structure. FIGS. 3A-3B illustrate another implementation of the antenna radiating structure including various densities of metal mesh acting as an antenna radiator portion extending along the perimeter of the structure. FIGS. 4-5 illustrate example implementations of an eye-tracking layer of an eye-tracking system including both micro LEDs with transparent metal mesh traces and wireless metal mesh antennas.

As just mentioned, existing devices may include antennas made from transparent conducting film to receive and transmit data wirelessly. Such transparent antennas, however, experience less conductivity than conventional metal antennas. Accordingly, as shown in one implementation in FIG. 1A, the present disclosure describes an antenna radiating structure 102*a* including a non-transparent antenna radiator portion 106 surrounding a portion of active transparent mesh portion 108. In at least one implementation, the antenna radiating structure 102*a* can support one or more of Wi-Fi 6E wireless networking technology, global positioning system (GPS), ultra-wideband (UWB), or 5G frequency bands below 6 GHz.

In one or more implementations, the active transparent mesh portion 108 can include a material—such as metal mesh—that provides optical transparency and conductivity at radio frequencies (e.g., 20 kHz-300 GHz). The non-transparent antenna radiator portion 106 can be a metalized or metallic film edge (e.g., such as with copper, magnesium, etc.) that includes an even higher level of conductivity than the active transparent mesh portion 108.

As further shown in FIG. 1A, the non-transparent antenna radiator portion 106 surrounds both an active transparent mesh portion 108 and a dummy transparent mesh portion 104. In one or more implementations, the dummy transparent mesh portion 104 serves as fill that does not transmit or receive data. In some implementations, this is due to breaks in the mesh of the dummy transparent mesh portion 104. Conversely, the active transparent mesh portion 108 includes unbroken metal mesh and can therefore transmit and receive data. In at least one implementation, the non-transparent antenna radiator portion 106 and the active transparent mesh portion 108 can connect to an antenna feed 110 that, in turn, connects to a control system. In that implementation, the active transparent mesh portion connects to the antenna feed 110 which can cross over the non-transparent antenna radiator portion 106.

As shown in FIG. 1B, many implementations of the antenna radiating structure 102*a* can be overlaid on a transparent lens 114. For example, the transparent lens 114 can be glass or some other transparent material (e.g., such as used in AR glasses). Additionally, as shown in FIG. 1B, one or more implementations of the antenna radiating structure 102*a* can include a dielectric housing 116. For example, the dielectric housing 116 may include any insulating material such as glass. Additionally, the non-transparent antenna radiator portion 106 can include an overhang 112 that covers or obscures the non-transparent antenna radiator portion 106 along the edge or perimeter of the transparent lens 114.

In at least one implementation, the non-transparent antenna radiator portion 106 can include a width that is completely obscured by the overhang 112. For example, in one or more implementations, the antenna radiating structure 102*a* transmits and receives data at a wavelength $\lambda$. In at least one implementation, the non-transparent antenna radiator portion 106 can include a width of no more than $\lambda/10$ (e.g., one-tenth the transmission wavelength). As such, when the antenna radiating structure 102*a* is used as part of eyepiece lenses (e.g., such as used in AR glasses), the non-transparent antenna radiator portion 106 is not noticeable under the overhang 112, nor does it obstruct the view of the wearer.

As discussed above, and as illustrated in FIGS. 1C, the antenna radiating structure 102*a* can include the active transparent mesh portion 108 surrounded by the non-transparent antenna radiator portion 106. As further shown in FIG. 1D, another antenna radiating structure 103 can include an outer active transparent mesh portion 108 surrounding an inner active transparent mesh portion 108. As further mentioned above, the antenna radiating structure 102*a* presents many advantages over other antenna radiating structures (e.g., such as the antenna radiating structure 103) such as that shown in FIG. 1D.

To illustrate, FIG. 1E includes a results graph showing radiation efficiency over frequency for the antenna radiating structure 102*a* (with the metalized edge enclosure) versus the antenna radiating structure 103 (with the transparent mesh enclosure). As shown, the antenna radiating structure 102*a* has greater radiation efficiency than the antenna radiating structure 103 across all frequencies. As such, the antenna radiating structure 102*a* out-performs the antenna radiating structure 103 that only includes transparent mesh antennas.

As shown in FIGS. 1A, 1B, and 1C, the antenna radiating structure 102*a* includes a non-transparent antenna radiator portion 106 that fully encircles the active transparent mesh portion 108. In an additional implementation shown in FIG. 2, an antenna radiating structure 102*b* can include the non-transparent antenna radiator portion 106 (e.g., the metalized edge) only partially surrounding the active transparent mesh portion 108'. Moreover, the antenna radiating structure 102*b* further includes an additional active transparent mesh portion 108" (e.g., that is separate from the active transparent mesh portion 108') abutting the non-transparent antenna radiator portion 106.

Together the non-transparent antenna radiator portion 106 and the additional active transparent mesh portion 108" encircle the inner active transparent mesh portion 108'. In the implementation shown in FIG. 2, the active transparent mesh portion 108" directly abuts the non-transparent antenna radiator portion 106 such that both can share the antenna feed 110. When overlaid on the transparent lens 114, the active transparent mesh portion 108" serves to increase the viewable area of the transparent lens 114, while the non-transparent antenna radiator portion 106 serves to increase the efficiency of the antenna radiating structure 102*b*.

FIG. 2 illustrates the non-transparent antenna radiator portion 106 positioned in a lower half of a diameter of the transparent lens 114 with the active transparent mesh portion 108' positioned in an upper half of the same diameter. In additional implementations, the non-transparent antenna radiator portion 106 and the active transparent mesh portion 108' may be positioned in different portions of the diameter of the transparent lens 114. Moreover, in additional implementations, the non-transparent antenna radiator portion 106 and the active transparent mesh portion 108' may alternate along the perimeter of the transparent lens 114 at a higher frequency than shown in FIG. 2 (e.g., with four portions of the non-transparent antenna radiator portion 106 alternating with four portions of the active transparent mesh portion 108').

In some implementations, an antenna radiating structure can achieve greater radiation efficiency in other ways. For example, FIG. 3A shows an enlarged view 302 of a corner of an antenna radiating structure 102*c*. In one or more implementations, the antenna radiating structure 102*c* features improved radiation efficiency by including multiple densities of metal meshes in the transparent metal mesh portions 304*a*, 304*b*, 304*c*, 304*d*, and 304*e* that run along a perimeter of a transparent lens.

In more detail, the density of metal mesh affects the conductivity and optical transparency in each of the transparent metal mesh portions 304*a*-304*e*. For example, the transparent metal mesh portion 304*a* has less conductivity but greater optical transparency than the transparent metal mesh portion 304*b*. Similarly, the transparent metal mesh portion 304*b* has less conductivity and greater optical transparency than the transparent metal mesh portion 304*c*, and so forth. Thus, as shown in FIG. 3B, the transparent metal mesh portions 304*a*-304*e* from the enlarged view 302 can include greater radiation efficiency than the active transparent mesh portion 108 within the antenna radiating structure 102*c*.

Moreover, due to the increasing levels of mesh densities in the transparent metal mesh portions 304*a*-304*e*, the transparent metal mesh portions 304*a*-304*e* may be more visible than the active transparent mesh portion 108. While FIG. 3B illustrates the transparent metal mesh portions 304*a*-304*e* completely encircling the active transparent mesh portion 108, other implementations are possible. For example, in an additional implementation, the transparent metal mesh portions 304*a*-304*e* may extend only along a bottom half of the perimeter of a transparent lens layer.

In summary, the disclosed implementations improve the radiation efficiency of antenna radiating structures while maintaining optimal levels of optical transparency. For example, some implementations incorporate both active transparent mesh portions and non-transparent antenna radiator portions. While the active transparent mesh portion can feature metal mesh with a high level of optical transparency, the non-transparent antenna radiator portion features a highly conductive metal antenna. Due to the placement of the non-transparent antenna radiator portion along a perimeter of a transparent lens, the optical transparency of the lens is largely unaffected. Additionally, some implementations feature areas of increased metal mesh density to achieve radiation efficiency levels similar to that of a metal antenna while maintaining the optical transparency of the lens. Thus, the disclosed implementations result in antenna radiating structures that are more conductive and efficient than transparent mesh antenna systems while maintaining optical transparency when incorporated into eyepiece devices.

EXAMPLE IMPLEMENTATIONS

Example 1: An apparatus including an antenna radiating structure including an active transparent mesh portion, a dummy transparent mesh portion, and a non-transparent antenna radiator portion extending along a perimeter of the antenna radiating structure and at least partially surrounding the active transparent mesh portion and the dummy transparent mesh portion, and a transparent lens overlayed with the antenna radiating structure.

Example 2: The apparatus of Example 1, wherein the non-transparent antenna radiator portion is overlaid with a dielectric housing.

Example 3: The apparatus of Examples 1 and 2, wherein the antenna radiating structure supports one or more of Wi-Fi 6E wireless networking technology, global positioning system (GPS), ultra-wideband (UWB), or 5G frequency bands below 6 GHz.

Example 4: The apparatus of any of Examples 1-3, wherein the active transparent mesh portion comprises a material that provides optical transparency and conductivity at radio frequencies.

Example 5: The apparatus of any of Examples 1-4, wherein the material is metal mesh.

Example 6: The apparatus of any of Examples 1-5, wherein the non-transparent antenna radiator portion has a higher conductivity than the active transparent mesh portion.

Example 7: The apparatus of any of Examples 1-6, wherein the non-transparent antenna radiator portion is metallic.

Example 8: The apparatus of any of Examples 1-7, wherein the non-transparent antenna radiator portion has a width less than $\lambda/10$.

Example 9: The apparatus of any of Examples 1-8, wherein the active transparent mesh portion connects to an antenna feed that crosses the non-transparent antenna radiator portion.

Example 10: An apparatus including an antenna radiating structure including an inner portion including at least one active transparent mesh area and at least one dummy transparent mesh portion, and an outer portion at least partially surrounding the inner portion, the outer portion including at least one non-transparent antenna radiator portion and at least one active transparent mesh portion, and a transparent lens overlayed with the antenna radiating structure.

Example 11: The apparatus of Example 10, wherein the at least one non-transparent antenna radiator portion abuts the at least one active transparent mesh portion in the outer portion of the antenna radiating structure.

Example 12: The apparatus of Examples 10 and 11, wherein the at least one active transparent mesh area in the inner portion of the antenna radiating structure is separate from the at least one active transparent mesh portion in the outer portion of the antenna radiating structure.

Example 13: The apparatus of any of Examples 10-12, wherein the at least one non-transparent antenna radiator portion is positioned in a lower half of a diameter of the outer portion of the antenna radiating structure and the at least one active transparent mesh portion is in an upper half of the diameter of the outer portion of the antenna radiating structure.

Example 14: The apparatus of any of Examples 10-13, wherein the outer portion of the antenna radiating structure is connected to an antenna feed that at least partially surrounds an antenna feed for the inner portion of the antenna radiating structure.

Example 15: A head-mounted display device including a pair of lenses within the head-mounted display device configured to be positioned in front of a user's eyes when the head-mounted display device is worn by a user, and wherein each of the pair of lenses includes a lens layer including a transparent lens, and an antenna radiating structure overlaying the lens layer including a first portion including transparent metal mesh with a first conductivity, and a second portion including transparent metal mesh with a second conductivity.

Example 16: The head-mounted display device of Example 15, wherein the second portion at least partially surrounds the first portion.

Example 17: The head-mounted display device of Examples 15 and 16, the second conductivity is higher than the first conductivity.

Example 18: The head-mounted display device of any of Examples 15-17, wherein the transparent metal mesh with the first conductivity including a first mesh density, the transparent metal mesh with the second conductivity including a second mesh density, and the second mesh density is higher than the first mesh density.

Example 19: The head-mounted display device of any of Examples 15-18, wherein the first portion includes a first optical transparency, the second portion includes a second optical transparency, and the first optical transparency is greater than the second optical transparency.

Example 20: The head-mounted display device of any of Examples 15-19, wherein the antenna radiating structure overlaying the lens layer further includes a third portion comprising transparent metal mesh with a third conductivity wherein the third portion at least partially surrounds the second portion, the third conductivity is higher than the second conductivity, the transparent metal mesh with the third conductivity includes a third mesh density that is higher than the second mesh density, and the third portion comprises a third optical transparency that is less than the second optical transparency.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Embodiments of the present disclosure may include or be implemented in-conjunction with various types of artificial reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 400 in FIG. 4) or that visually immerses a user in an artificial reality (such as, e.g., virtual-reality system 500 in FIG. 5). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 4, augmented-reality system 400 may include an eyewear device 402 with a frame 410 configured to hold a left display device 415(A) and a right display device 415(B) in front of a user's eyes. Display devices 415(A) and 415(B) may act together or independently to present an image or series of images to a user. While augmented-reality system 400 includes two displays, embodiments of this disclosure may be implemented in augmented-reality systems with a single NED or more than two NEDs.

In some embodiments, augmented-reality system 400 may include one or more sensors, such as sensor 440. Sensor 440 may generate measurement signals in response to motion of augmented-reality system 400 and may be located on substantially any portion of frame 410. Sensor 440 may represent one or more of a variety of different sensing mechanisms, such as a position sensor, an inertial measurement unit (IMU), a depth camera assembly, a structured light emitter and/or detector, or any combination thereof. In some embodiments, augmented-reality system 400 may or may not include sensor 440 or may include more than one sensor. In embodiments in which sensor 440 includes an IMU, the IMU may generate calibration data based on measurement signals from sensor 440. Examples of sensor 440 may include, without limitation, accelerometers, gyroscopes, magnetometers, other suitable types of sensors that detect motion, sensors used for error correction of the IMU, or some combination thereof.

In some examples, augmented-reality system 400 may also include a microphone array with a plurality of acoustic transducers 420(A)-420(J), referred to collectively as acoustic transducers 420. Acoustic transducers 420 may represent transducers that detect air pressure variations induced by sound waves. Each acoustic transducer 420 may be configured to detect sound and convert the detected sound into an electronic format (e.g., an analog or digital format). The microphone array in FIG. 4 may include, for example, ten acoustic transducers: 420(A) and 420(B), which may be designed to be placed inside a corresponding ear of the user, acoustic transducers 420(C), 420(D), 420(E), 420(F), 420(G), and 420(H), which may be positioned at various locations on frame 410, and/or acoustic transducers 420(I) and 420(J), which may be positioned on a corresponding neckband 405.

In some embodiments, one or more of acoustic transducers 420(A)-(J) may be used as output transducers (e.g., speakers). For example, acoustic transducers 420(A) and/or 420(B) may be earbuds or any other suitable type of headphone or speaker.

The configuration of acoustic transducers 420 of the microphone array may vary. While augmented-reality system 400 is shown in FIG. 4 as having ten acoustic transducers 420, the number of acoustic transducers 420 may be greater or less than ten. In some embodiments, using higher numbers of acoustic transducers 420 may increase the amount of audio information collected and/or the sensitivity and accuracy of the audio information. In contrast, using a lower number of acoustic transducers 420 may decrease the computing power required by an associated controller 450 to process the collected audio information. In addition, the position of each acoustic transducer 420 of the microphone array may vary. For example, the position of an acoustic transducer 420 may include a defined position on the user, a defined coordinate on frame 410, an orientation associated with each acoustic transducer 420, or some combination thereof.

Acoustic transducers 420(A) and 420(B) may be positioned on different parts of the user's ear, such as behind the pinna, behind the tragus, and/or within the auricle or fossa. Or there may be additional acoustic transducers 420 on or surrounding the ear in addition to acoustic transducers 420 inside the ear canal. Having an acoustic transducer 420 positioned next to an ear canal of a user may enable the microphone array to collect information on how sounds arrive at the ear canal. By positioning at least two of acoustic transducers 420 on either side of a user's head (e.g., as binaural microphones), augmented-reality system 400 may simulate binaural hearing and capture a 3D stereo sound field around a user's head. In some embodiments, acoustic transducers 420(A) and 120(B) may be connected to augmented-reality system 400 via a wired connection 430, and in other embodiments acoustic transducers 420(A) and 120(B) may be connected to augmented-reality system 400 via a wireless connection (e.g., a BLUETOOTH connection). In still other embodiments, acoustic transducers 420(A) and 120(B) may not be used at all in conjunction with augmented-reality system 400.

Acoustic transducers 420 on frame 410 may be positioned in a variety of different ways, including along the length of the temples, across the bridge, above or below display devices 115(A) and 115(B), or some combination thereof. Acoustic transducers 420 may also be oriented such that the microphone array is able to detect sounds in a wide range of directions surrounding the user wearing the augmented-reality system 400. In some embodiments, an optimization process may be performed during manufacturing of augmented-reality system 400 to determine relative positioning of each acoustic transducer 420 in the microphone array.

In some examples, augmented-reality system 400 may include or be connected to an external device (e.g., a paired device), such as neckband 405. Neckband 405 generally represents any type or form of paired device. Thus, the following discussion of neckband 405 may also apply to various other paired devices, such as charging cases, smart watches, smart phones, wrist bands, other wearable devices, hand-held controllers, tablet computers, laptop computers, other external computer devices, etc.

As shown, neckband 405 may be coupled to eyewear device 402 via one or more connectors. The connectors may be wired or wireless and may include electrical and/or non-electrical (e.g., structural) components. In some cases, eyewear device 402 and neckband 405 may operate independently without any wired or wireless connection between them. While FIG. 1 illustrates the components of eyewear device 402 and neckband 405 in example locations on eyewear device 402 and neckband 405, the components may be located elsewhere and/or distributed differently on eyewear device 402 and/or neckband 405. In some embodiments, the components of eyewear device 402 and neckband 405 may be located on one or more additional peripheral devices paired with eyewear device 402, neckband 405, or some combination thereof.

Pairing external devices, such as neckband 405, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 400 may be provided by a paired device or shared between a paired device and an eyewear device, thus reducing the weight, heat profile, and form factor of the eyewear device overall while still retaining desired functionality. For example, neckband 405 may allow components that would otherwise be included on an eyewear device to be included in neckband 405 since users may tolerate a heavier weight load on their shoulders than they would tolerate on their heads. Neckband 405 may also have a larger surface area over which to diffuse and disperse heat to the ambient environment. Thus, neckband 405 may allow for greater battery and computation capacity than might otherwise have been possible on a stand-alone eyewear device. Since weight carried in neckband 405 may be less invasive to a user than weight carried in eyewear device 402, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 405 may be communicatively coupled with eyewear device 402 and/or to other devices. These other devices may provide certain functions (e.g., tracking, localizing, depth mapping, processing, storage, etc.) to augmented-reality system 400. In the embodiment of FIG. 4, neckband 405 may include two acoustic transducers (e.g., 420(I) and 420(J)) that are part of the microphone array (or potentially form their own microphone subarray). Neckband 405 may also include a controller 425 and a power source 435.

Acoustic transducers 420(I) and 420(J) of neckband 405 may be configured to detect sound and convert the detected sound into an electronic format (analog or digital). In the embodiment of FIG. 4, acoustic transducers 420(I) and 420(J) may be positioned on neckband 405, thereby increasing the distance between the neckband acoustic transducers 420(I) and 420(J) and other acoustic transducers 420 positioned on eyewear device 402. In some cases, increasing the distance between acoustic transducers 420 of the microphone array may improve the accuracy of beamforming performed via the microphone array. For example, if a sound is detected by acoustic transducers 420(C) and 420(D) and the distance between acoustic transducers 420(C) and 420(D) is greater than, e.g., the distance between acoustic transducers 420(D) and 420(E), the determined source location of the detected sound may be more accurate than if the sound had been detected by acoustic transducers 420(D) and 420(E).

Controller 425 of neckband 405 may process information generated by the sensors on neckband 405 and/or augmented-reality system 400. For example, controller 425 may process information from the microphone array that describes sounds detected by the microphone array. For each detected sound, controller 425 may perform a direction-of-arrival (DOA) estimation to estimate a direction from which the detected sound arrived at the microphone array. As the microphone array detects sounds, controller 425 may populate an audio data set with the information. In embodiments in which augmented-reality system 400 includes an inertial measurement unit, controller 425 may compute all inertial and spatial calculations from the IMU located on eyewear device 402. A connector may convey information between augmented-reality system 400 and neckband 405 and between augmented-reality system 400 and controller 425. The information may be in the form of optical data, electrical data, wireless data, or any other transmittable data form. Moving the processing of information generated by augmented-reality system 400 to neckband 405 may reduce weight and heat in eyewear device 402, making it more comfortable to the user.

Power source 435 in neckband 405 may provide power to eyewear device 402 and/or to neckband 405. Power source 435 may include, without limitation, lithium ion batteries, lithium-polymer batteries, primary lithium batteries, alkaline batteries, or any other form of power storage. In some cases, power source 435 may be a wired power source. Including power source 435 on neckband 405 instead of on eyewear device 402 may help better distribute the weight and heat generated by power source 435.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 500 in FIG. 5, that mostly or completely covers a user's field of view. Virtual-reality system 500 may include a front rigid body 502 and a band 504 shaped to fit around a user's head. Virtual-reality system 500 may also include output audio transducers 506(A) and 506(B). Furthermore, while not shown in FIG. 5, front rigid body 502 may include one or more electronic elements, including one or more electronic displays, one or more inertial measurement units (IMUS), one or more tracking emitters or detectors, and/or any other suitable device or system for creating an artificial-reality experience.

Artificial reality systems may include a variety of types of visual feedback mechanisms. For example, display devices in augmented-reality system 400 and/or virtual-reality system 500 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 400 and/or virtual-reality system 500 may include microLED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 400 and/or virtual-reality system 500 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
- an antenna radiating structure comprising:
  - an active transparent mesh portion;
  - a dummy transparent mesh portion; and
  - a non-transparent antenna radiator portion extending along a perimeter of the antenna radiating structure and at least partially surrounding the active transparent mesh portion and the dummy transparent mesh portion; and
- a transparent lens overlayed with the antenna radiating structure.

2. The apparatus of claim 1, wherein the non-transparent antenna radiator portion is overlaid with a dielectric housing.

3. The apparatus of claim 1, wherein the antenna radiating structure supports one or more of Wi-Fi 6E wireless networking technology, global positioning system (GPS), ultra-wideband (UWB), or 5G frequency bands below 6 GHz.

4. The apparatus of claim 1, wherein the active transparent mesh portion comprises a material that provides optical transparency and conductivity at radio frequencies.

5. The apparatus of claim 4, wherein the material is metal mesh.

6. The apparatus of claim 1, wherein the non-transparent antenna radiator portion has a higher conductivity than the active transparent mesh portion.

7. The apparatus of claim 1, wherein the non-transparent antenna radiator portion is metallic.

8. The apparatus of claim 1, wherein the non-transparent antenna radiator portion has a width less than $\lambda/10$.

9. The apparatus of claim 1, wherein the active transparent mesh portion connects to an antenna feed that crosses the non-transparent antenna radiator portion.

10. An apparatus comprising:
- an antenna radiating structure comprising:
  - an inner portion comprising at least one active transparent mesh area and at least one dummy transparent mesh portion; and
  - an outer portion at least partially surrounding the inner portion, the outer portion comprising at least one non-transparent antenna radiator portion and at least one active transparent mesh portion; and
- a transparent lens overlayed with the antenna radiating structure.

11. The apparatus of claim 10, wherein the at least one non-transparent antenna radiator portion abuts the at least one active transparent mesh portion in the outer portion of the antenna radiating structure.

12. The apparatus of claim 10, wherein the at least one active transparent mesh area in the inner portion of the antenna radiating structure is separate from the at least one active transparent mesh portion in the outer portion of the antenna radiating structure.

13. The apparatus of claim 10, wherein the at least one non-transparent antenna radiator portion is positioned in a lower half of a diameter of the outer portion of the antenna radiating structure and the at least one active transparent mesh portion is in an upper half of the diameter of the outer portion of the antenna radiating structure.

14. The apparatus of claim 10, wherein the outer portion of the antenna radiating structure is connected to an antenna feed that at least partially surrounds an antenna feed for the inner portion of the antenna radiating structure.

15. A head-mounted display device comprising:
- a pair of lenses within the head-mounted display device configured to be positioned in front of a user's eyes when the head-mounted display device is worn by a user; and
- wherein each of the pair of lenses comprises:
  - a lens layer comprising a transparent lens; and
  - an antenna radiating structure overlaying the lens layer comprising:
    - a first portion comprising transparent metal mesh with a first conductivity; and
    - a second portion comprising transparent metal mesh with a second conductivity.

16. The head-mounted display device of claim 15, wherein the second portion at least partially surrounds the first portion.

17. The head-mounted display device of claim 16, the second conductivity is higher than the first conductivity.

18. The head-mounted display device of claim 17, wherein:
- the transparent metal mesh with the first conductivity comprises a first mesh density;
- the transparent metal mesh with the second conductivity comprises a second mesh density; and
- the second mesh density is higher than the first mesh density.

19. The head-mounted display device of claim 18, wherein:
- the first portion comprises a first optical transparency;
- the second portion comprises a second optical transparency; and
- the first optical transparency is greater than the second optical transparency.

20. The head-mounted display device of claim 19, wherein the antenna radiating structure overlaying the lens layer further comprises a third portion comprising transparent metal mesh with a third conductivity wherein:
- the third portion at least partially surrounds the second portion;
- the third conductivity is higher than the second conductivity;
- the transparent metal mesh with the third conductivity comprises a third mesh density that is higher than the second mesh density; and the third portion comprises a third optical transparency that is less than the second optical transparency.

* * * * *